United States Patent
Almeida

(10) Patent No.: US 8,280,967 B2
(45) Date of Patent: Oct. 2, 2012

(54) VIRTUAL EMAIL METHOD FOR PREVENTING DELIVERY OF UNSOLICITED AND UNDESIRED ELECTRONIC MESSAGES

(75) Inventor: John Almeida, Richmond, CA (US)

(73) Assignee: UnoWeb Inc., Emeryville, CA (US)

( * ) Notice: Subject to any disclaimer, the term of this patent is extended or adjusted under 35 U.S.C. 154(b) by 230 days.

(21) Appl. No.: 12/751,522

(22) Filed: Mar. 31, 2010

(65) Prior Publication Data

US 2010/0198928 A1 Aug. 5, 2010

Related U.S. Application Data

(63) Continuation-in-part of application No. 11/623,300, filed on Jan. 15, 2007, now abandoned.

(51) Int. Cl.
*G06F 15/16* (2006.01)
*G06F 15/173* (2006.01)
(52) U.S. Cl. .................. 709/206; 709/203; 709/224
(58) Field of Classification Search .................. 709/206, 709/245, 203, 224, 231
See application file for complete search history.

(56) References Cited

U.S. PATENT DOCUMENTS

| 6,161,129 | A | * | 12/2000 | Rochkind | 709/206 |
| 6,591,291 | B1 | * | 7/2003 | Gabber et al. | 709/206 |
| 6,973,481 | B2 | * | 12/2005 | MacIntosh et al. | 709/206 |
| 2002/0188689 | A1 | * | 12/2002 | Michael | 709/206 |
| 2003/0200334 | A1 | * | 10/2003 | Grynberg | 709/245 |
| 2005/0044156 | A1 | * | 2/2005 | Kaminski et al. | 709/206 |

* cited by examiner

*Primary Examiner* — Quang N. Nguyen
(74) *Attorney, Agent, or Firm* — Louis Ventre, Jr.

(57) ABSTRACT

A method is used to filter an electronic message using virtual email sent to a server using a virtual email address created by the server for a recipient-identified. The virtual email address comprises a sender identification in combination with the recipient's non-encoded email address. The server identifies the email recipient using the recipient's non-encoded email address, identifies the email sender as authorized, stores the email sender's identification, stores email comprising the virtual email address; enables the recipient to access the email; enables the recipient to create a virtual email address, receives the virtual email; receives a second electronic message from a non-user-identified sender at the server, responds to the non-user-identified sender requesting an answer that only a human could provide; and, receives the answer from the non-user-identified sender and if the answer is correct, then creates an electronic account on the server for the non-user-identified.

13 Claims, 7 Drawing Sheets

Fig. 5

| Folder | eMail Sender | Message |
|---|---|---|
| james | myemail-james@emailserver.com | hello 1 |
|  | myemail-james@emailserver.com | hello 2 |
|  | myemail-james@emailserver.com | hello 3 |
| maria | myemail-maria@emailserver.com | hello 1 |
|  | myemail-maria@emailserver.com | hello 2 |
|  | myemail-maria@emailserver.com | hello 3 |
| joao | myemail-joao@emailserver.com | hello 1 |
|  | myemail-joao@emailserver.com | hello 2 |
| cheng | myemail-cheng@emailserver.com | hello 1 |

500 — Folder
502 — eMail Sender
504 — Message
506 — james group
508 — maria group
510 — joao group
512 — cheng group

Fig. 6

|  | Delete | Archive | eMail Sender | Message |
|---|---|---|---|---|
| 1 | X |  | myemail-james@emailserver.com | hello 1 |
| 2 |  | X | myemail-james@emailserver.com | hello 2 |
| 3 |  | X | myemail-james@emailserver.com | hello 3 |
| 4 | X |  | myemail-maria@emailserver.com | hello 1 |
| 5 |  | X | myemail-maria@emailserver.com | hello 2 |
| 6 |  |  | myemail-maria@emailserver.com | hello 3 |
| 7 |  |  | myemail-joao@emailserver.com | hello 1 |
| 8 |  |  | myemail-joao@emailserver.com | hello 2 |
| 9 |  |  | myemail-cheng@emailserver.com | hello 1 |

612 — Delete
610 — Archive
608 — eMail Sender
606 — Message

Fig. 7

| 6 | ☐ | ☐ | myemail-maria@emailserver.com | hello 3 |
|---|---|---|---|---|
| 7 | ☐ | ☐ | myemail-joao@emailserver.com | hello 1 |
| 8 | ☐ | ☐ | myemail-joao@emailserver.com | hello 2 |
| 9 | ☐ | ☐ | myemail-cheng@emailserver.com | hello 1 |

| james | myemail-james@emailserver.com | hello 2 |
|---|---|---|
| 800 | myemail-james@emailserver.com | hello 3 |
| maria | myemail-maria@emailserver.com | hello 2 |

802

VIRTUAL EMAIL METHOD FOR PREVENTING DELIVERY OF UNSOLICITED AND UNDESIRED ELECTRONIC MESSAGES

CROSS-REFERENCE TO RELATED APPLICATIONS

This application is a continuation-in-part of application Ser. No. 11/623,300, filed 15 Jan. 2007, which is hereby incorporated by reference herein

TECHNICAL FIELD

This invention relates to a method where an email recipient assign a virtual email account to each email sender thus preventing deliver of unsolicited and undesired electronic messages.

BACKGROUND ART

An email is subdivided into two parts by the "@" character, and they are: the first part before (left) the "@" character is the recipient's email address; and the second part (right) after the "@" character is the email server domain—name of the email server. Once a email sender sends a email to a email recipient, the sending server will parse the email and send it to the receiving email server, the server domain indicated at the right of the "@" sign. Once the email server receives the email it will match it against email recipient indicated on the left of the "@" sign.

Many vendors of electronic mail servers, as well as many third-party vendors, offer spam-blocking software to detect, label and sometimes automatically remove spam. Presently, there exist many methods for detecting, labeling and removing spam.

Representative methods are taught in the prior art of Amiram Grynberg publication s#US 20030200334 (Grynberg). Grynberg teaches a method where the recipient's email is encrypted and the encrypted part is concatenated with the sender's email information thus hiding the recipient's email and exposing the sender's email.

Grynberg on one hand hides the recipient's email and on the other hand exposes the sender's email to spammer. Furthermore, Grynberg requires complex and resource extensive public-encryption software and hardware for the purpose of encrypting and decrypting emails.

SUMMARY OF INVENTION

A method is used to filter an electronic message using virtual email sent to a server using a virtual email address created by the server for a recipient-identified. The virtual email address comprises a sender identification in combination with the recipient's non-encoded email address. The server identifies the email recipient using the recipient's non-encoded email address, identifies the email sender as authorized, stores the email sender's identification, stores email comprising the virtual email address; enables the recipient to access the email; enables the recipient to create a virtual email address, receives the virtual email; receives a second electronic message from a non-user-identified sender at the server, responds to the non-user-identified sender requesting an answer that only a human could provide; and, receives the answer from the non-user-identified sender and if the answer is correct, then creates an electronic account on the server for the non-user-identified.

Optionally, the server: accepts an email sent to the user's virtual email address by an unknown sender when the email address used contains a user-identified filter; adds a parameter to the virtual email address to enable it to recognize the position of the identification name of the sender and the position of the user's email address within the virtual email address; forms the virtual email address it can recognize by concatenating the identification name of the sender and the user's email address; and notifies an unknown sender that an electronic account has been created for him on the server.

The server may allow an unknown sender to send an email to a user at a virtual email address. First the virtual email address used has an identification of the non-user-identified sender and contains the recipient's email address, provided the recipient's email is not encoded and provided that the recipient's email address is an ID used by the email recipient's server to identify the email recipient in the recipient's email server. Next, the virtual email address includes user-identified filter recognized by the server to allow email sent to the user by the non-user-identified sender to be received at the email server for the user.

The server may also recognize a parameter in the virtual email address used by the unknown sender when the parameter identifies the position within the virtual email address of the name of the non-user-identified sender, the user's email address, and the user-identified filter.

The invention may take the form of a computer program product, which is a computer usable medium that comprises a computer readable program code embodied therein, which implements the above steps of the invention.

TECHNICAL PROBLEM

If the email recipient has the email address of "myemail@emailserver.com," then in this context the recipient email address is "myemail" and the email server domain is "emailserver.com." Anyone can send emails to "myemail" recipient. Currently, the only way to stop unwanted emails is by installing filters in the server domain "myemailserver.com" or by reconfiguring the server's email software to block unwanted emails.

Existing solutions to unwanted emails are costly, time consuming and faulty. For the fact that any sophisticated email spammer, and in the majority of the cases they are, will be able to find ways of working around filters and emails server's configurations. Basically, anyone possessing the recipients email address can send any number of emails to the email account and in most cases without any restriction whatsoever, that is, some email server use filters to filter out some incoming email and these filters varies from good to no avail. Actually, none are one hundred percent bullet proof against email spammers.

SOLUTION TO PROBLEM

The present invention uses a process that involves dividing the recipient (left part before the "@" character) email address into at least two separate parts. The first part having the recipient's email address, the second part of the email is the email sender code (sender ID), and if a third part happens to be present therefore, it will have the email recipient preset filter.

The invention prevents blocked spam form using computer resources by saving a single copy of the same email saved and relating all recipients to the single copy of the saved email. Duplicate emails are deleted. The email may or may not be a spam. But, if the sender correctly responds to the submitted question, then the saved email is copied and saved into the recipient's folder or database.

The invention to enables a non-user-identified sender to send an email to a user at a virtual email address.

ADVANTAGEOUS EFFECTS OF INVENTION

The invention is a superior method of stopping, filtering out unwanted emails (junk emails, spam emails, unsolicited emails, etc., henceforth called unwanted emails) without hindering the receiving of legitimate emails.

The present invention enables the saving of a single blocked email for a broad base of users without wasting resources as the teachings of the prior arts. It further teaches the saving of a single email that is associated with a plurality of users without duplicating the email to each user, thus saving resources that would otherwise be wasted with blocked email spam.

The present invention may be used and implemented in a chat room, communications systems like social networks. The electronic message may be a message sent to a plurality of users and instead of each user receiving the message a single message may be stored and a plurality of user IDs may be related to the single message.

BRIEF DESCRIPTION OF DRAWINGS

The accompanying drawings, which are incorporated in the form a part of this specification, illustrate preferred embodiments of the invention and, together with the description, serve to explain the principles of the invention:

FIG. 5 illustrates an email structure having virtual emails for each email sender to the receiver email account.

FIG. 6 illustrates a screen exemplary view for virtual email management involving a delete and archive processes.

FIG. 7 illustrates a general email folder after the delete and archive processes of FIG. 6.

FIG. 8 illustrates individual folder after the delete and archive processes of FIG. 6.

DESCRIPTION OF EMBODIMENTS

The present invention is described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Since all the currently available solutions to unwanted email addresses the filtering of unwanted emails in the email server side without having any consideration of the email recipient's concern, this invention address the email recipient instead and away from the email server's underlay technologies. The process involves in dividing the recipient's email address into two or more parts, and they follow.

EXAMPLE 1

For the email address "myemail@emailserver.com," the email recipient "myemail" assigns an email address for a specific email sender so as to permit the server to receive emails from the specific email sender. The email address is subdivided to identify a specific email sender, for example "Bob Daily."

The email recipient assigns a unique email address to "Bob Daily," such as "emailsender-bday@emailserver.com." It is unique because the only one having this email will be "Bob Daily." A third part of the email optionally sets a filter so all the emails bearing the filter are automatically received.

This process herein is called "virtual email."

Background of Email Communication

Figure 2:
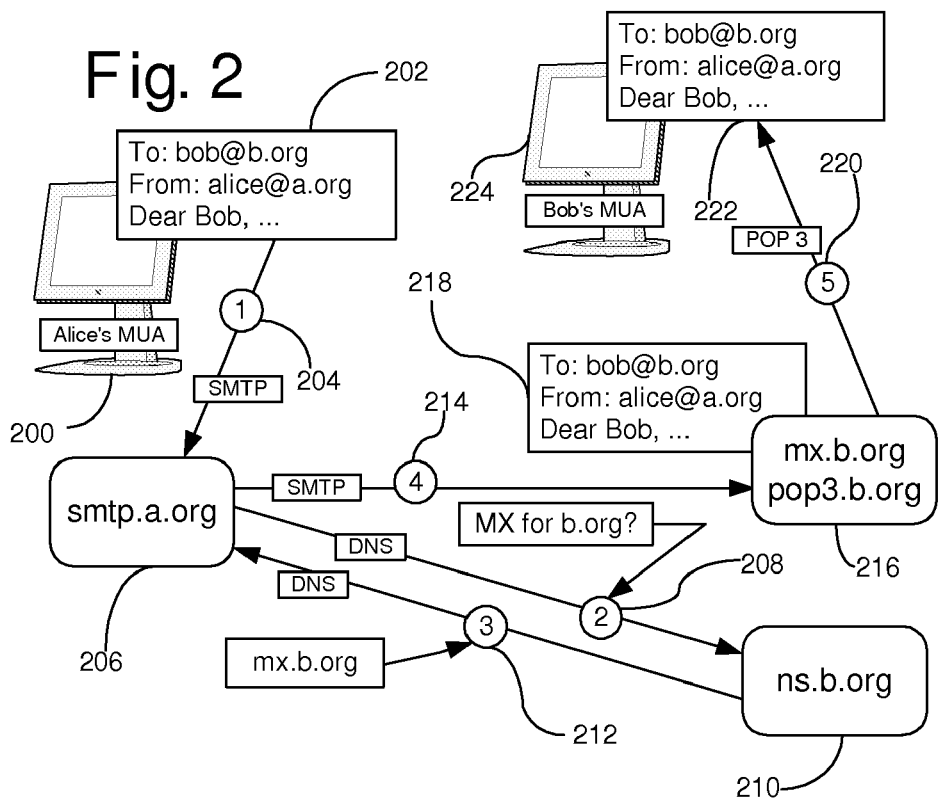
FIG. 2 illustrates a process of sending and receiving email.

FIG. 2 illustrates the process involving email sending and receiving using the Internet. The diagram of FIG. 2 illustrates a typical sequence of events that takes place when Alice composes a message 202 using her Mail User Agent (MUA) 200. She types in, or selects from an address book, the email address of her correspondent. She hits the "send" button, then:

Her MUA 200 formats the message of the Internet email format and uses the Simple Mail Transfer Protocol (SMTP) 204 to send the message to the local Mail Transfer Agent (MTA), in this case smtp.a.org 206, run by Alice's Internet Service Provider (ISP).

The MTA 206 looks at the destination address provided in the SMTP protocol (not from the message header) 208, in this case bob@b.org. An Internet email address is a string of the form localpart@domain.example, which is known as a Fully Qualified Domain Address (FQDA). The part before the @ sign is the local part of the address, often the username of the recipient, and the part after the @ sign is a domain name. The MTA looks up this domain name in the Domain Name System (DNS) to find the mail exchange servers accepting messages for that domain 210.

The DNS server for the b.org domain, ns.b.org 210, responds with an MX record listing the mail exchange servers for that domain, in this case mx.b.org 212, a server run by Bob's ISP.

smtp.a.org 206 sends the message 214 to mx.b.org 216 using SMTP, which delivers it to the mailbox of the user bob 218.

Bob presses the "get mail" button in his MUA 224, which picks up the message using the Post Office Protocol (POP3) 220 then reads it 222.

This sequence of events applies to the majority of email users. However, there are many alternative possibilities and complications to the email system:

Alice or Bob may use a client connected to a corporate email system, such as IBM's Lotus Notes or Microsoft's Exchange. These systems often have their own internal email format and their clients typically communicate with the email server using a vendor-specific, proprietary protocol. The server sends or receives email via the Internet through the product's Internet mail gateway, which also does any necessary reformatting. If Alice and Bob work for the same company, the entire transaction may happen completely within a single corporate email system.

Alice may not have a MUA on her computer but instead may connect to a webmail service.

Alice's computer may run its own MTA, so avoiding the transfer at step 1.

Bob may pick up his email in many ways, for example using the Internet Message Access Protocol, by logging into mx.b.org 216 and reading it directly, or by using a webmail service.

Domains usually have several mail exchange servers so that they can continue to accept mail when the main mail exchange server is not available.

Previously, many MTAs would accept messages for any recipient on the Internet and do their best to deliver them. Such MTAs are called open mail relays. This was important in the early days of the Internet when network connections were unreliable. If an MTA couldn't reach the destination, it could at least deliver it to a relay that was closer to the destination. The relay would have a better chance of delivering the message at a later time. However, this mechanism proved to be exploitable by people sending unsolicited bulk email and as a consequence very few modern MTAs are open mail relays, and many MTAs will not accept messages from open mail relays because such messages are very likely to be spam.

The people, email addresses and domain names in this explanation are fictional.

Email Sender and Receiver Device

Figure 3:
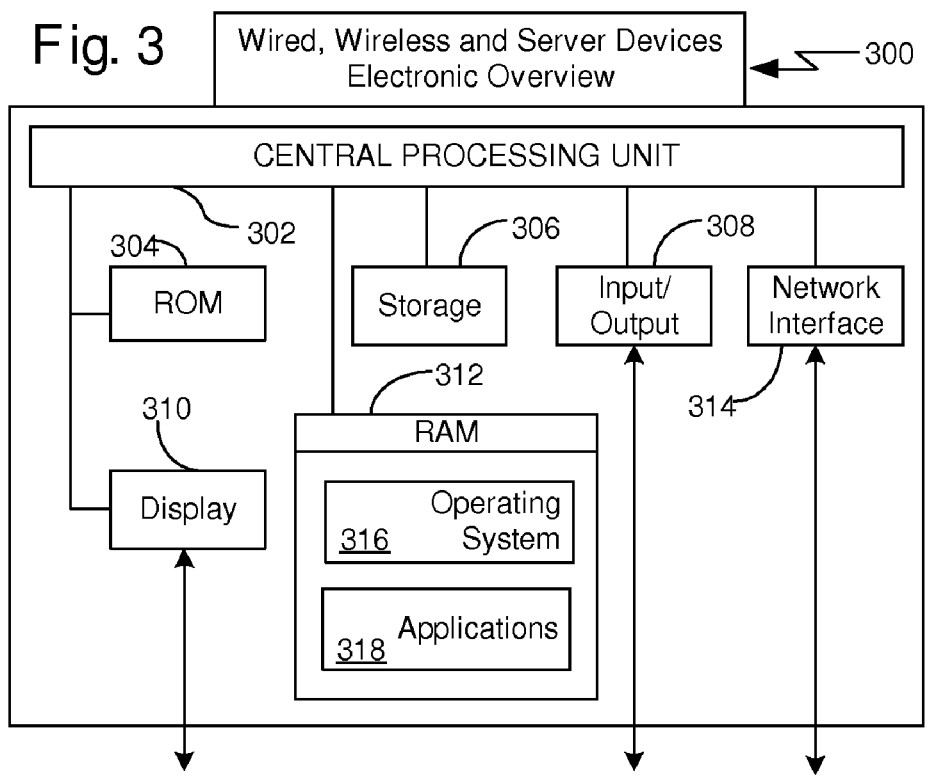
FIG. 3 illustrates a device for sending and receiving email.

FIG. 3 illustrates the electronic configuration for the devices used for the email communication process. As it is understood by those skilled in the art, not all components may be shown for all devices or some devices may not have all of the shown components, still other devices may have more components than those presented in the drawings. This is to simplify the explanation of this invention and is not intended to obscure its meaning and mode of use.

The device 300 has a Central Processing Unit (CPU) 302, which is the brain of the device, controlling the device's functionalities. The device 300 has programming code means for its initialization at power up, which is usually stored in the permanent storage medium. In this case, it is in a Read Only Memory (ROM) 304. It may be stored in any other permanent storage medium.

After power up, the CPU 302 reads the programming code from the ROM 304 and starts processing it. It will load an Operating System (OS) 316 from the storage device 306 into the Read Access Memory (RAM) 312.

The OS 316 loads software applications 318 as needed into the RAM 312 and as applications 318 are executed, their interaction are presented to the user at the display 310. As needed, the OS 316 will receive input from others devices that are interfaced with the device 300 by using its Input Output (IO) port 308, the devices can be but not limited to: mouse, keyboard, touch screen, etc.

The OS 316 sends output to other interfacing devices as well, such as but not limited to: screen, printer, audio card, video card, etc. Once the device 300 hundred receives or sends email it will use the Network Interface 314.

A Preferred Embodiment

Figure 1:
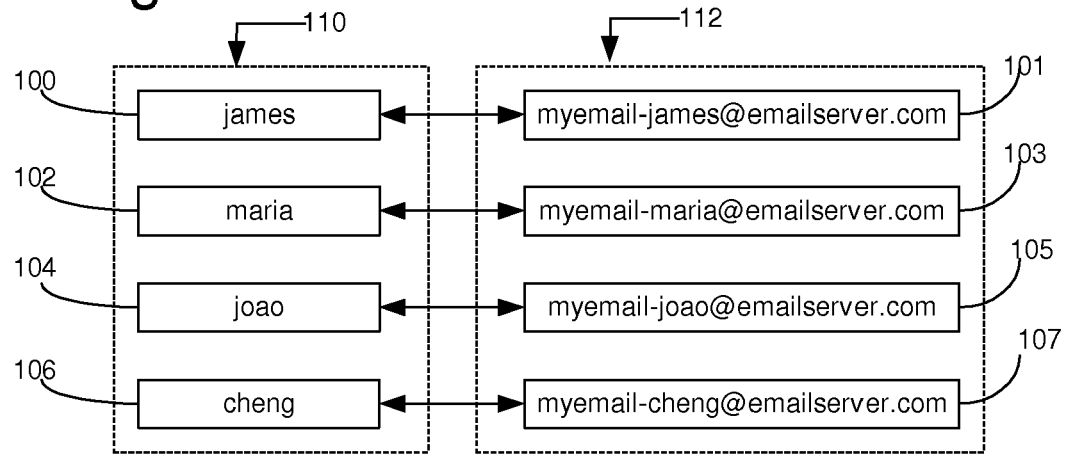
FIG. 1 illustrates assigning a virtual email address to an email sender.

FIG. 1 illustrates virtual-email. To the left of FIG. 1, four email senders 100, 102, 104 and 106 are illustrated in the email recipient's address list 110. To the right 112 there is a group of virtual-email addresses and each of the email addresses is assigned to an email sender 101, 103, 105 and 107 shown on the left 110.

The first email sender 101 "myemail-james@emailserver.com" is assigned to the email sender "James" 100. Once "James" 100 sends an email to the email recipient "myemail," "James" will send the email using his virtual-email "myemail-James@emailserver.com." This is only assigned to "James" 100. If anyone spams that email address in the future, all the email recipient will have to do to stop the spamming is delete the virtual-email "myemail-James@emailserver.com." This will permanently block future spam. If "James" 100 is an important contact of the email recipient, then a new virtual-mail can be created and the old one permanently deleted.

The server at which "James" is sending the email to the email recipient "myemail-james@emailserver.com" will do all the communication and have the email sent by "James" directed to the server domain "emailserver.com." Once the "emailserver.com" receives the email it will first look for the email account "myemail." If it exists, it will further look for the sender id "James" that is part of the recipient's email account. If found, the server will place the email in an appropriate folder/data base record assigned to "James" and under the recipient's email address "myemail."

Regarding the sender id that is part of the email recipient's account, it can be separated from the recipient's email account by using any character (such as the dash "-" character), or it can be specified in terms of location within the recipient's email account. For instance, the sender id for "James" could as well have been "myemail000james" and would have been interpreted as ten positions "myemail000" of the recipient email account with the second part the sender id "James." Also, it can be based on the last part of the recipient's email account and the send id for "James" could as well have been "myemailjames0" and in this case the last six position are reserved for the user id "james0". It can be setup in any conceivable way and only limited by the human imagination.

Although this is a very efficient means of stopping spammer, there will be times when it is desired to allow others to send emails without having a specific email assigned to them. For example, on printed business cards, or when the recipient assigns an email to a specific sender and forgets to set the receiver's virtual email account to receive the email. In both such cases, both senders are legitimate and if no other means are configured in the recipient's email server, the emails have to be returned.

When a business card identifies an email address of "myemail@emailserver.com", or a virtual email "myemail-friend@emailserver.com" and this is used to send an email to the "emailserver.com," then the invention allows receipt of such emails. Also, it is convenient to be able to allow the use a fixed email address in an advertisement, etc. Finally, in the circumstance when the recipient has given to the intended email sender a virtual email address for the recipient, but forgot to set the virtual email account to "myemail-friend," or didn't have the time to do so, etc. In these circumstances, the senders are legitimate senders. Since the objective of this invention is to stop spammers and not legitimate senders, the invention implements a new method to enable receipt of such email.

Once an email is received and a virtual email is not yet assigned or the email is received by the actual recipient's email account, the email server will be programmed to send an email back to the sender asking the sender to confirm its identity and the confirmation will be in a format that only a human can reply to. The process works as following: the email server will send an email to the email sender account with a link identifying the email [1]; the user receive the email and clicks on the link [2]; the link will direct the user to a page from the email server where it originated [3]; the server will send a page to the email sender (user) asking for a reply that only a human can do [4]; the user provides the reply [5]; if the reply is the correct one, the email server will place the email into the recipient email box [6]; and a new page is sent back to the user notifying that the email has been delivered [7]. It can be done in many other ways as well and anyone with skill of the art will be able to conceive many other ways without departing from the true spirit and the teaching depicted herein.

Figure 4:
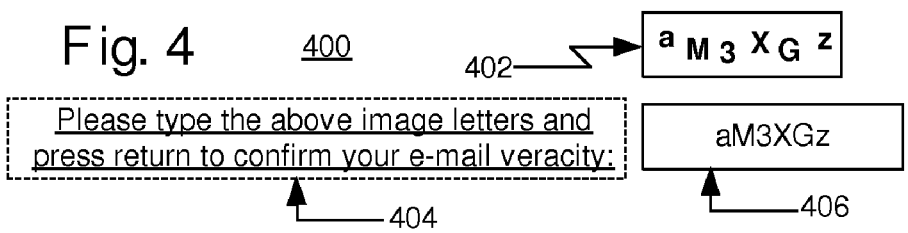
FIG. 4 illustrates a confirmation process for allowing a user without an assigned virtual email address to be authorized.

FIG. 4 illustrates a way of allowing mail from legitimate senders in the situations just described. The page or return email is sent to the sender 400 by the email server. It asks the sender to supply an answer. The page may have a machine generated image 402, a question, instruction 404, form text for the user to input the reply 406, or other means to test the legitimacy of the sender. For example, the image 402 contains machine generate character for a user to enter into the field 406 and they are: "aM3XGz." After the sender replies to the page, once the email server receive it and if the supplied answer is the correct one, than the email will be placed into the recipient email box. An image is used in the example, because a person will have no difficulty in replying, but a machine or computer would have difficulty in deciphering values placed on Page of them. The image can be skewed before presenting it on a page, thus, making it even harder for an algorithm to guess its values.

Using means for receiving a human reply may involve the email server sending a page that will have images on it. For example, four images may be used (it can be any number): an elephant [1]; a giraffe [2]; a crocodile [3]; and a falcon [4], and the question might be: "please select an elephant" and the user will select the image with the elephant and of the email server authenticates the answer, then places the email into the recipient's email box.

This method may employ a combination of two or more images as well. For example, asking the user to choose images that have a specific background, color, format, etc.

There is at least one other way for creating a filter that will allow wanted emails to be received by the email recipient without hindering legitimate users.

Figure 4A:
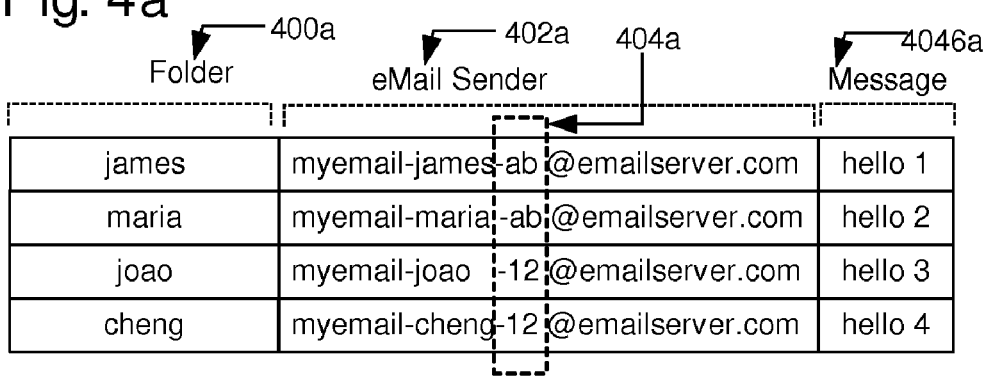
FIG. 4a illustrates a filter to automatically allow a non-registered virtual email sender to send email without being required to confirm.

FIG. 4a it is a further illustration of FIG. 1. It illustrates the folder 400a assigned to the each user as at FIG. 1. Each user has an addition extension assigned to each virtual email account 402a and for the first two users it is "ab" and for the last two users it is "12" 404a. The extension shown and assigned to each virtual email, is user (recipient) set as to allow the email server means for receiving legitimate emails before the virtual email account is setup.

In the exemplary explanation for two users, the filter "ab" is used and later changed to "12" for the last two users (it can as well be that they both are active filters). Since a spammer will need to know the extension to send unwanted emails, such knowledge will be unlikely to be available especially since the email recipient may change the filter often and any old filter then becomes useless.

Two characters are shown for the extension and a short value for the sender's ID. It is to be understood that in reality it can be any length and in most of the cases they are more than just a few characters. By using the filter the present invention offers a novel method wherein an email recipient is able to offer a virtual email to an email sender without having the email sender's ID stored in the email recipient's server and without requiring the email sender to correctly respond to question send to the email sender by the email sender's email server.

The first positions can be the sender ID and the filter field, just the sender ID or just the filter field, e.g., "123jamesmyemail." The first three characters "123" are the filter, the next five characters "James" are the sender ID and the rest of it is the receiver email account [1]. For "123myemail," the first three characters comprise the filter and the rest of it the receiver email account [2]. For "Jamesmyemail," the first five characters "James" identify the sender ID and the rest of it the receiver email account [3].

The email server can be setup to allow the email recipient to set one or more filters as well, for instance, e.g. a user setup two filters "abc" and "123." Then, all virtual emails having the filter fields of "abc" or "123" will be accepted.

Another example is: "jamesmyemail12@emailserver.com", "12myemailjames@emailserver.com", etc. For these two virtual emails "myemail-james-ab@emailserver.com" and "myemail-James-12@emailserver.com" are two distinct virtual emails; "james-myemail-ab@emailserver.com" and "James-myemail-12@emailserver.com" are two distinct virtual emails as well. Once again, any conceivable combination can be used and only limited by the human imagination. As long as the receiving email server is able to extract the recipient's email account from the virtual string, its purpose has been achieved.

In the case where extension filters are used for the purpose of allowing the receiving of incoming emails they will allow email into the recipients email box regardless if the sender's ID has been setup by the email recipient. Once any of the two aforementioned methods (for requesting confirmation of the use of a filter) are used, the recipient at the time of viewing the received emails will have the option to allow the email server to automatically create the virtual email for the email sender.

There may be a button or other means for asking permission from the email recipient to create the virtual email for the email sender. In the case of the first example "myemail@emailserver.com," the recipient will be given an option to setup a virtual email for the email sender and the email sender will be notified by email of the new virtual email accordingly.

FIG. 5 illustrates a further embodiment of the arrangement of FIG. 1 and it depicts one way in the process of organizing folders to each virtual email sender. There are four folders 500, one for each user. The first user "James" 506 has three emails 504 assigned to his virtual email 502. The same is true for the other user 508, 510 and 512. This is Just one way of organizing individual virtual email accounts and many more ways can be devised and implemented without departing from the true spirit of this invention.

FIG. 6 illustrates a single page where the email recipient can manage all of the virtual emails at once. There is a delete column 612; an archive column 610 which once selected the emails will automatically be assigned to each individual folders of FIG. 5. The next two columns are for the virtual email accounts 608 and the virtual email messages 606. The delete and archive columns —612 and 610 respectively each have some boxes checked, the total of two for the delete column 612; the total of three for the archive column 610 and the total of four are left unchecked (rows 6-9).

FIG. 7 illustrates a new page list that has only the last four rows that were not checked (deleted or archived) 700 from the table of FIG. 6.

FIG. 8 illustrates the two folders of the checked box of FIG. 6 of the archive column 610 which had the rows 2, 3 and 5 checked. They were messages "hello 2" and "hello 3" for "James" 800 rows 2 and 3 of FIG. 6; as for "maria" 802 it is Just one and it is "hello 2" row 5 of FIG. 6.

The invention includes a method to port current, in-use email address format (two parts email format) from current email recipients' addresses book to a new address book having the new virtual email format and use the new virtual email format from the new created address book.

Figure 9:
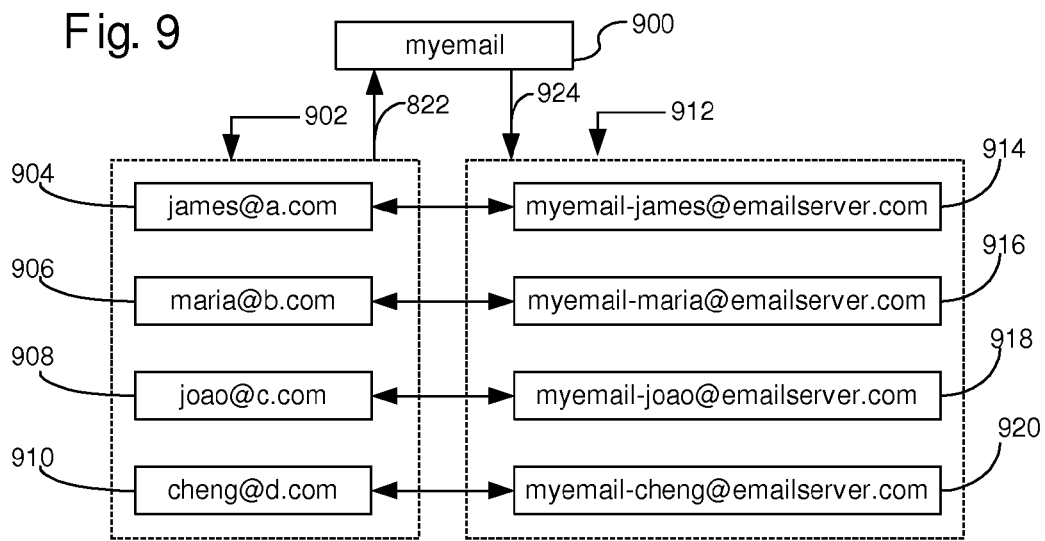
FIG. 9 illustrates porting an individual folder from a user's email address book from the current email format to this invention's format using default setup.

FIG. 9 illustrates such a method. To the left is an address book 902 and used by "myemail" user 900 and it has four emails 904, 906, 908 and 910. The new format 912 shows each email ported to the new format using the default format therein, the email recipient ID "myemail" followed by the sender ID.

Figure 10:
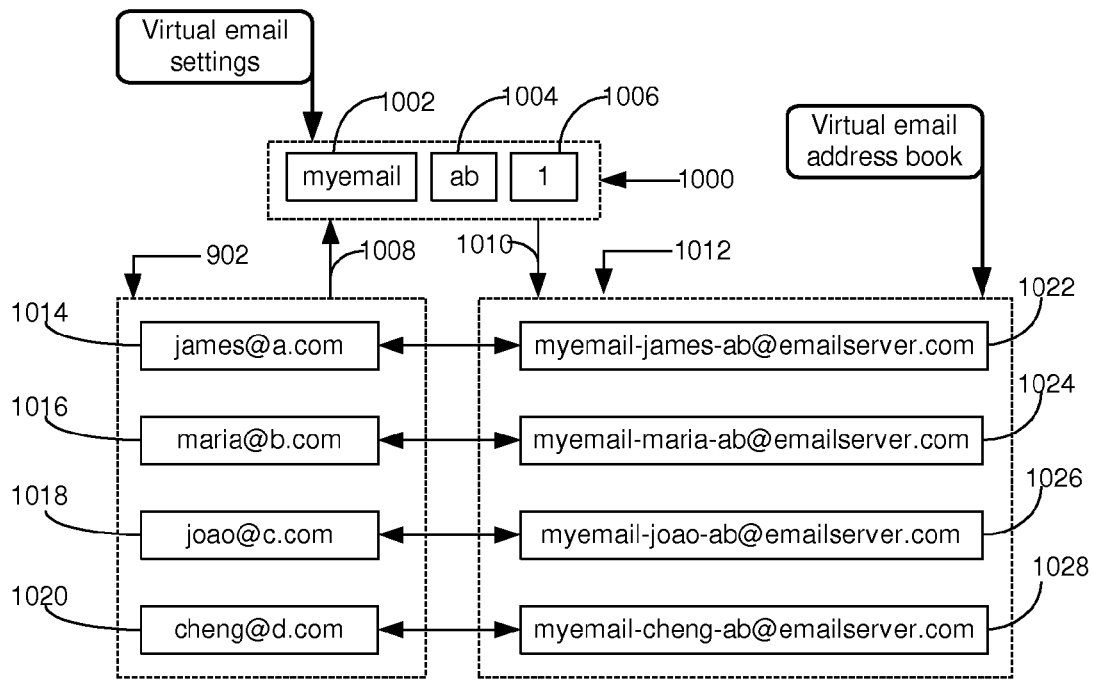
FIG. 10 illustrates a further embodiment of FIG. 9 where an individual folder from a user's email address book being ported from the current email format to this invention's format using virtual email settings.

FIG. 10 illustrates another method and using a set of parameters 1000, an email recipient "myemail" 1002, the filter parameter 1004 and the setting parameter 1006.

The email setting parameter 1006 is the parameter that indicates the format the server will use for the recipient email format. In FIG. 9, the default parameter is used and it is set in FIG. 10. It is the value of "1," which produces the same result as in FIG. 9, that is, the default parameter is "1." The parameter may be of any value and is not necessarily those shown for this example. For instance, it can "0" for the format "jamesmyemailab"; "2" for "abjamesmyemail"; "3" for "abemailjames"; "4" for "ab-james-myemail"; etc. Once emails are ported to the new virtual email address book, the server may automatically generate emails and forward them to each recipient notifying of the new virtual email account setup therein.

In an alternative embodiment of the present invention prevents blocked spam/email from cluttering and wasting resources on the email recipient's email server, this alternative embodiment allows a single copy of the same email to be saved instead of a great number of blocked emails stored in the email server. As well, it allows a database record relating each email recipient's ID to the received email that comprises the same or similar content as the saved email, thus deleting all other duplicated emails and having only a single save copy saved.

Once an email is blocked, a question that only a human can answer is sent to the email sender and if the sender correctly responds to the submitted question the email is presented to the email recipient.

In every case, each blocked email is stored in the server and if it is a spam it will simply waste resources. This invention is to block spam as well to save resources. In this situation where the email sender correctly responds to the question, the saved email is copied from the main storage where a single copy of the email exists and saved into the recipient's folder or database, the email may or may not be a spam. As well it may be that only a reference to the actual email is presented to the email recipient and the email server will simply present the email to the user without making a second copy of it. If it is implemented in a global database, the recipient's email server may simply receive a copy from the central server at the time the email recipient requests it, without actually saving a copy in the recipient's account, folder or database.

In the event where a single copy is saved and used to present to a group of users the single email copy is presented to other users virtually and only a single copy may exist for one or more users without duplicating it to every owner-recipient. Therefore, a single email copy is saved. This enables presenting the single email copy to a plurality of email recipients; wherein the plurality of email recipients are associated with a single email copy. The body of the single email is the same for all users and the header changes to reflect each user.

Every time an email is received and the email sender is not yet registered with the server, the electronic mail is blocked and a question is submitted to the electronic mail sender. Once the email sender correctly responds to the question the email is stored into the email recipient's folder or database account. Since a spammer may send a great number of spamming-emails to a broad base of recipients and it may be in the thousands or even millions. Thus, the invention may be used to stop spammers and to save resources that would otherwise be wasted on spam.

Based on this explanation, if the recipients are within a company or email provider, a lot of resources are potentially wasted since the blocked email will be stored for a certain period of time for each user before the email/spam is deleted from the email server to release resources. So, this invention will save a received email and other new incoming emails will be compared with the saved email and if it happens to be the same or of a similar content, then the extra copies are deleted and the email recipient user's ID is added in a database table to have it related with to the first email, thus stopping the duplication of unwanted email and saving email server's resources. The mechanism to compare emails may be an artificial intelligence program to detect their content or it may be to compare their message body's content, or any other means that achieve the same result.

In case the content is similar or very close with just a few words or phrases that differ, the system is intelligent enough to detect these small variations and save just the small variations into the recipient account and have an index pointer pointing to the location of these differences and having the other content form the saved email, so as to say that the saved email becomes a template for all users and the distinctive words or phrases are inserted in each email at the time the email is presented to the actual recipient. It is within the intent of this invention that this mechanism be used for other purpose besides emails.

And in yet another preferred embodiment of the present invention one email (or any other type of electronic document like a word processing page, spreadsheet pages, etc) may be like "this is a great day for a great vacation" and a second email may be like "this is a great year for a great vacation."

In both situations only the words "year" and "day" differ so the server will save the first email as is "this is a great day for a great vacation" and the second email only the word "year" will be saved and pointing to the first email body's content and pointing to the location where the word "day" starts and the number of characters to be replaced with the word "year."

The second email may be simply saved as "first_document_location:year17:3" and this means "first_email_location" pointer to the first email location on the server (it may as well be a database table relationship) and the word "year" will be placed at the position "17" and at the position 17 three characters will be removed as indicated by "3." Of course this is only one illustration and many more may be developed to offer the basic end result without departing from the true spirit of this disclosure. This embodiment may be used on any electronic document and including email, as well all documents may belong to a single user or to a plurality of users without departing from the true spirit of the present invention.

Figure 11:
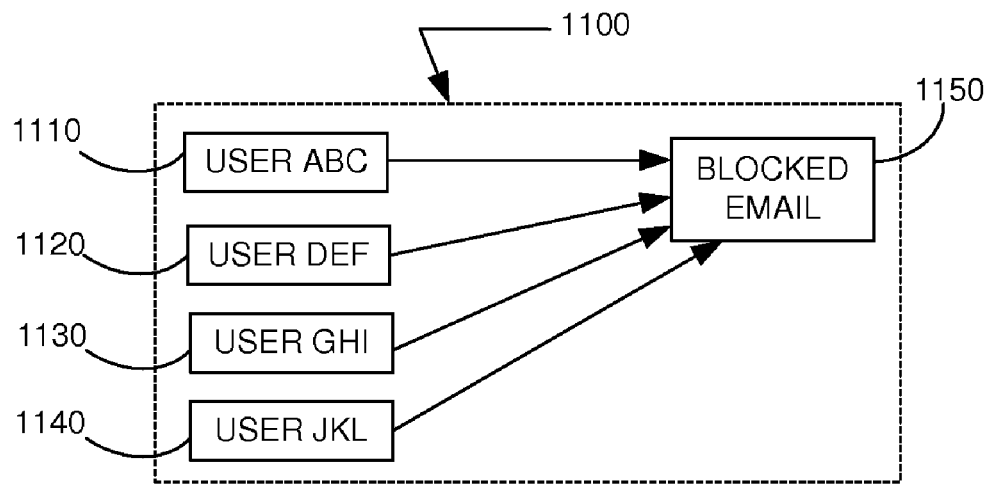
FIG. 11 illustrates a single copy of an email being saved and related to a plurality of users.

FIG. 11 illustrates the alternative embodiment 1100 comprising email recipients 1110, 1120, 1130 and 1140 and each is related to the same blocked email 1150. Based on this overview, there is only one email instead of four emails that would needed to be saved in each of the recipient's folder or database. The resources savings becomes quite large especially since spammers send a great many emails to a broad base of users at a typical email provider.

The electronic message does not have to be blocked. It can be a regular received email, as well, without departing from the true spirit of the disclosure of the present invention.

Figure 12:
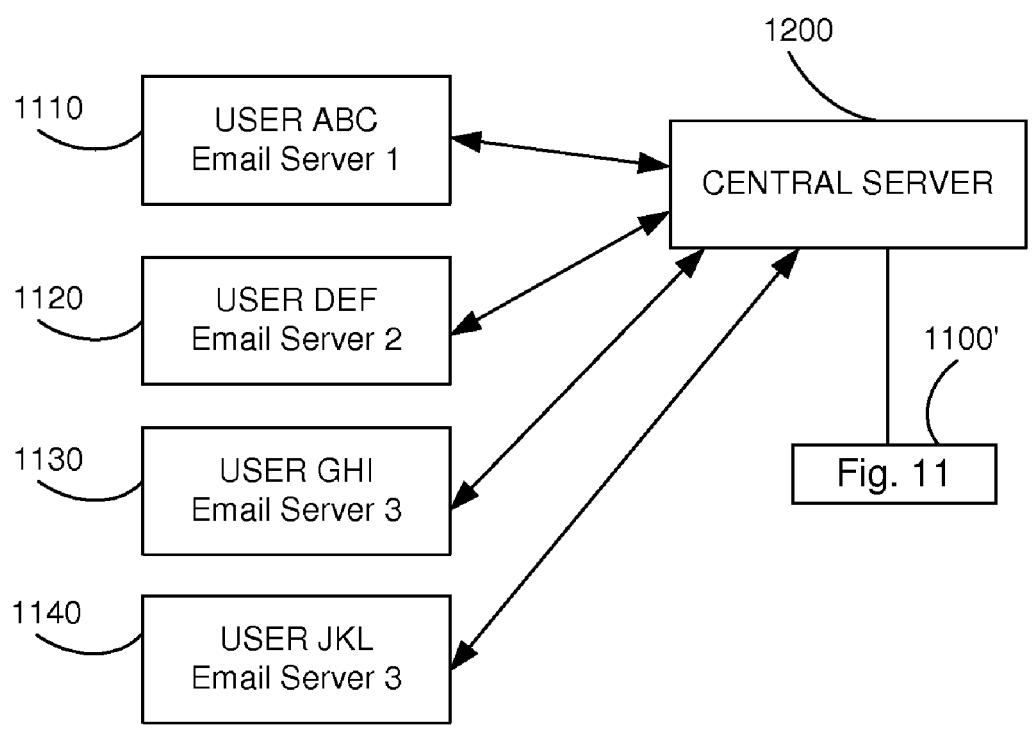
FIG. 12 illustrates a further embodiment of FIG. 11 where each email recipient is located at distinct email servers.

FIG. 12 illustrates an implementation of a central server (it may be any other server as well). Once a blocked email is received by the email server, the email server may send the blocked email to the centralized server. The central server receives the recipient's ID and the email from the recipient's email server and saves the recipient's ID. It then relates the recipient's ID to the saved email and if the email is a duplicate, the central server communicates with the recipient's email server to delete the duplicated copy stored therewith in memory or on a magnetic-storage means.

This embodiment may as well be implemented where the first copy of the email is saved with each server, the recipient's email server and the central server or all saving may be done by the central server, as well it can be a combination of both, the central server and the recipient's email serves sharing the resources by having some email in the central server and others in the email server where the email recipient has an account with. It may be implemented that all the processes are done by a single server, the recipient's email server or the central server, etc.

In the case where the sender is not registered with the recipient's email server and the recipient's email server sends a question that only a human can answer and after the sender provides the correct answer to the recipient's email server, the recipient's email server requests from the central server the email and saves it to recipient email account at the recipient's email server if it is not yet saved therein.

As well, it may be implemented where the central server does all the saving of all emails and relates all recipients from a plurality of email servers to a single email copy and the recipients' email servers may free their resources for purposes other than saving duplicated emails. It may be implemented where the central server saves all the email for all email recipients from a plurality of recipient's email servers without departing from the teachings of the present invention.

In case the email is a duplicated email and a single copy residing at the central server, then the single copy may became a virtual copy to all email recipients for the single email at the central server and the virtual copy is assigned to the email recipients located at a plurality of email servers.

Thus, a single email is presented to a plurality of email recipients as a virtual email to each email recipient and each email recipient having an email account with distinct email servers and each email server located at a distinct Internet/network address. The email server may as well be located at a single Internet/network address as well without departing from the true spirit of the invention.

By having a combination of email server and a centralized server (the central server may or may not be an email server) the invention may be implemented on a global scale since spammers spam email in a global scale then email servers anywhere on the Internet may communicate with the central server to check for email or to send email to it.

FIG. 12 illustrates the four email recipients of FIG. 11. Each is located at distinct email server. Each email server is connected with the centralized server 1200. This is the same embodiment 1100 of FIG. 11, where the central server saves the email recipients' IDs and associate them with the blocked email.

FIG. 11 illustrates the invention in a single server and FIG. 12 illustrates the invention used in a global base. In both embodiments, a single email is saved thus saving a great deal of resources that is not available in the prior art.

Figure 13:
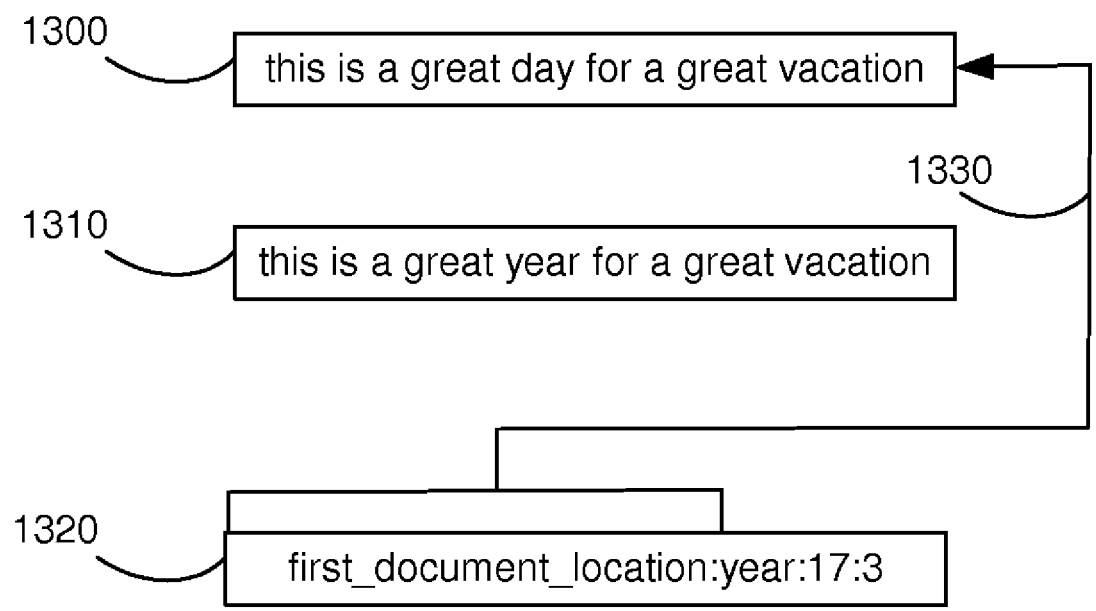
FIG. 13 illustrates a further embodiment of the present invention where two similar electronic documents are saved to two or more users and only the dissimilar words or phrase are saved.

FIG. 13 depicts the first document 1300. It comprises the phrase "this is a great day for a great vacation." FIG. 13 also depicts the second document 1310 comprising the phrase "this is a great year for a great vacation" and the second document is saved as "first_document_location:year:17:3" 1320. The "first_document_location" and an index to the first document 1330 is also saved.

Indexing may be in other forms like a separate database table's field for the purpose of presenting an index to point to the first document or it may be folder's address where the first document is saved. The second document 1310 is not saved, only a reference for it is saved 1320.

The means of identifying the similarity between two or more documents may involve counting the words on each document and if the dissimilar words that don't appear between the two documents hits a threshold for instance ten percent are dissimilar that the two contents are similar or if it hits a threshold that is higher or lower that a preset threshold the two documents are similar and the similar words or phrases are removed and saved for the secondary documents. It may as well be that the words that are not similar determine the threshold for the contents similarity or the contents dissimilarity without departing from the true scope and meaning of the present invention.

Thus described, the invention may include several embodiments. First, the method is one of filtering an electronic message using virtual email and a virtual email address. It includes steps of: providing a server, the server comprising a computer, and the server configured for receiving an electronic message sent by an email sender to an email recipient; creating a virtual email address for a recipient-identified sender to use to send the electronic message to the recipient, the virtual email address comprising a sender identification in combination with the recipient's non-encoded email address; enabling the server to identify the email recipient using the recipient's non-encoded email address; enabling the server to identify the email sender as an authorized email sender when the email sender's identification is in an email to the recipient; storing the email sender's identification on the server in an email recipient's account so that it is related to the recipient's non-encoded email address; using the email recipient's account for storing email comprising the virtual email address; enabling the recipient to access the email; enabling the email recipient to create a virtual email address for assignment to a specific email sender; receiving the electronic message using the virtual email address; receiving a second electronic message from a non-user-identified sender at the server, wherein the second electronic message comprises a second virtual email address, the second virtual email address comprising an identification of the non-user-identified sender in combination with the non-encoded recipient's email address, wherein the virtual email address for the non-user-identified is not registered with the recipient's email server; responding to the non-user-identified sender requesting an answer that only a human could provide; and, receiving the answer from the non-user-identified sender and if the answer is correct, then creating an electronic account on the server for the non-user-identified sender and storing the second electronic message in the newly created electronic account.

This first method may include steps of enabling the server to accept an email sent to the user's virtual email address by a non-user-identified and unknown sender if the user's virtual email address comprises a user-identified filter that; and if the identified filter is preset by the email recipient and pre-registered at the recipient's email account before the non-user-identified and unknown sender sends the email; and, redesignating the non-user-identified and unknown sender as a user-identified sender.

This first method may further include steps of enabling the server to add a component to the virtual email address, the component comprising a parameter identifying the position of the identification name of the sender and the position of the user's email address within the virtual email address; and, enabling the server to recognize a parameter in the second email address, the parameter comprising an identification of the position of the identification name of the sender and the position of the user's email address within the second virtual email address.

This first method may further include steps of enabling the server to create the email address configured such that the identification name of the sender and the user's email address in the virtual email address are concatenated without a separating character between them; and, enabling the server to recognize the second electronic message configured such that the identification name of the non-user-identified sender and the user's email address in the second virtual email address are concatenated without a separating character between them.

This first method may further include the step of notifying the non-user-identified sender that an electronic account has been created for the non-user-identified sender on the server.

Secondly, the method describes steps for using virtual email to allow a non-user-identified sender to send an email to a user at a virtual email address. These steps include: providing an email server, comprising a computer, for receiving an email sent by a non-user-identified sender to a virtual email address for a user, wherein the virtual email address comprises: an identification of the non-user-identified sender; the recipient's email address; wherein the recipient's email is not encoded; wherein the recipient's email address is an ID used by the email recipient's server to identify the email recipient in the recipient's email server; and, a user-identified filter that is recognized by the email server to allow email sent to the user by the non-user-identified sender to be received at the email server for the user; receiving an email at the email server sent to the virtual email address for the user by a sender; and enabling the server to recognize the user-identified filter when it is part of the non-user-identified virtual email; and, enabling the email recipient to preset the identified filter for virtual email to the email recipient.

This second method may further include enabling the server to recognize a parameter in the virtual email address, the parameter comprising an identification the position within the virtual email address of the identification name of the non-user-identified sender, the user's email address, and the user-identified filter.

Thirdly, the invention may take the form of a computer program product, comprising a computer usable medium having a computer readable program code embodied therein. The computer readable program code is adapted to be executed on a server and causes the server to implement a method for converting an email address to a virtual email address. This method comprises the steps of: providing a server for creating a sender-specific virtual email address for a user; accessing an email from an address-book of the two-parts email format wherein the two-parts email format comprises the email-server domain and the email recipient's email address and retrieving an email; creating said sender-specific virtual email address for a user by combining components comprising the recipient's email address and an identification of the sender from the accessed email, wherein the recipient's email address is not encoded; and, creating a virtual email account on the server designating the sender by the sender-specific virtual email address.

This third embodiment, that is, the computer program product may also include code that implement one or more steps of: enabling the server to add to the sender-specific virtual email address a parameter. The parameter comprises an identification of the position of the user's email address and an identification of the sender; sending an email to the user notifying the user of the sender-specific virtual email address; enabling the server to assign the same recipient-identified to two or more virtual email senders; enabling the server to assign two or more recipient-identified filters to the same email recipient; enabling the server to recognize a single sender's identification from two or more email senders when each email sender has a distinct recipient-identified filter; enabling the server to assign the same recipient-identified filter to two or more virtual email senders; enabling the server to recognize two or more recipient-identified filters for an email recipient; and, enabling the server to recognize a single sender's identification used by two or more email senders when each email sender has a distinct recipient-identified filter.

Overview

The invention assigns a single electronic message to a plurality of recipients comprising the steps of: providing a server, comprising a computer, for receiving a first electronic message sent by an email sender to a first email recipient; wherein the first email recipient comprising a first ID; storing the received first electronic message; receiving a second electronic message sent by an electronic message sender to a second email recipient; wherein the second email recipient comprising a second ID; retrieving the first received electronic message and comparing the first received electronic message with the second received electronic message; and if the first electronic message and the second electronic message are the similar or the same then storing the second ID in a database and relating the second ID with the first electronic message. The method further comprising the steps of: the first electronic message recipient and the second electronic message recipient are registered with two distinct servers.

In another preferred embodiment of the present invention, a single electronic message is assigned to a plurality of recipients. This method comprises steps of: providing a computer for storing a first electronic document; comparing a second electronic document with the first electronic document and if the contents of the first electronic document and the second electronic document are of similar nature; identifying words or phrases present on the second electronic document that differ from the first electronic document; and saving on the second electronic document only words or phrases of the second electronic document that don't appear on the first electronic document and instructions for the replacement of the words or phrases of the first electronic document that don't appear in the second electronic document.

The present invention provides a method of filtering an electronic message using virtual email. The method comprises steps of: providing a server, comprising a computer, for receiving an electronic message sent by an email sender to an email recipient; creating a virtual email address for a recipient-identified sender to use to send the electronic message to the recipient, the virtual email address comprising a sender identification in combination with the recipient's non-encoded email address comprising a virtual email; wherein the recipient's non-encoded email address represent the actual email recipient's email address part of the email used by the email recipient's server to identify the email recipient at the email server; wherein the email sender's identification is used by the recipient's email server as to enable the server to identify the email sender as an authorized email sender to send the email to the email recipient; wherein the email sender's identification is stored in the email recipient's email server and related to the recipient's non-encoded email address; creating an electronic account on the server for storing email using the virtual email address, wherein the electronic account is accessible by the recipient and not the sender, wherein the virtual email creation is initiated by the email recipient, and wherein the created virtual email address is assigned to a specific email sender; receiving the electronic message using the virtual email address; the specific email sender sending the electronic message using the virtual email address to a destination consisting of a storage location in the electronic account; receiving a second electronic message from a non-user-identified sender at the server, wherein the second electronic message comprises a second virtual email address, the second virtual email address comprising an identification of the non-user-identified sender in combination with the non-encoded recipient's email address; wherein the virtual email address for the non-user-identified is not registered with the recipient's email server; responding to the non-user-identified sender requesting an answer that only a human could provide; and receiving the answer from the non-user-identified sender and if the answer is correct, then creating an electronic account on the server for the non-user-identified sender and storing the second electronic message in the newly created electronic account.

The present invention is a method of virtual email allowing a non-user-identified sender to send an email to a user at a virtual email address. This method comprises the steps of: providing an email server, comprising a computer, for receiving an email sent by a non-user-identified sender to a virtual email address for a user, wherein the virtual email address comprises: an identification of the non-user-identified sender; the recipient's email address; wherein the recipient's email is not encoded; wherein the recipient's email address is an ID used by the email recipient's server to identify the email recipient in the recipient's email server; and, a user-identified filter that is recognized by the email server to allow email sent to the user by the non-user-identified sender to be received at the email server for the user; receiving an email at the email server sent to the virtual email address for the user by a sender; and wherein the user-identified filter is part of the non-user-identified virtual email; and wherein the identified filter is preset by the email recipient and pre-registered at the recipient's email account prior to a non-user-identified can send virtual email to the email recipient.

The present invention may take the form of a computer program product implementing the steps described herein. The computer program product comprises a computer usable medium having a computer readable program code embodied therein. The computer readable program code is adapted to be executed on a server causes the server to implement a method for converting an email address to a virtual email address. This method comprises the steps of: providing a server for creating a sender-specific virtual email address for a user; accessing an email from an address-book of the two-parts email format wherein the two-parts email format comprises the email-server domain and the email recipient's email address and retrieving an email; creating said sender-specific virtual email address for a user by combining components comprising the recipient's email address and an identification of the sender from the accessed email, wherein the recipient's email address is not encoded; and, creating a virtual email account on the server designating the sender by the sender-specific virtual email address.

The present invention is a method for assigning a single electronic message to a plurality of recipients. The method comprises the steps of: providing a server, comprising a computer, for receiving a first electronic message sent by an electronic message sender to a first electronic message recipient; receiving a second electronic message sent by an electronic message sender to a second electronic message recipient; comparing the two electronic messages' contents and if the contents of the two electronic messages are of similar nature; identifying words or phrases present on the second electronic message that differ from the first electronic message; and saving for the second electronic message recipient only the words or phrases of the second electronic message that don't appear on the first electronic message and instructions for the replacement of the words or phrases of the first electronic message that don't appear in the second electronic message.

A method has been disclosed that enables an email recipient to assign individual virtual emails to each email sender to the email recipient and the assigned virtual email having at least two parts. That is, one part being the recipient email account (it can be either the first or any other part of the virtual email) and the other part is the sender ID for the sender.

In case there are three parts, one part will be the recipient email account, another part the sender ID and the other additional part the recipient preset filter.

Once a recipient's preset filter is active, all the received virtual emails for the recipient are automatically assigned to the recipient's account.

As noted, it can be in any arrangement and the recipient email account can be the first, the last, the middle part or any section of the virtual email. As well, the two parts as well may be one part for the recipient's email account and the other part for the email recipient's preset filter.

Furthermore, a means for sending a page to the email sender prompting the sender for an answer that cannot be answered by a machine and it will be sent automatically by the email server whenever a sender sends an email message to the recipient's main email account or to a virtual account that is not yet setup.

All the names and domains used for the exemplary explanations are fictitious and not associated with names or domains known to applicant of this invention.

The invention may be used in such a way that is not exactly as described in this disclosure but that produces similar results or even be used in an entirely different settings but the end result still becomes obvious from the teachings of this invention. By electronic message it is intended to be any kind of message handed by a computer and not exclusively an email message.

Although the present invention and its advantages have been described in detail, it should be understood that various changes, substitutions and alterations could be made herein without departing from the true spirit and scope of the invention as defined by the appended claims. Moreover, the scope of the present application is not intended to be limited to the particular embodiments of the process, machine, manufacture, composition of matter, means, methods, computer software and steps described in the specification. As one of ordinary skill in the art will readily appreciate from the disclosure of the present invention, processes, machines, manufacture, compositions of matter, means, methods, computer software, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, computer software or steps.

What is claimed is:

1. A method of filtering an electronic message using virtual email comprising the steps of:
providing a server, the server comprising a computer, and the server configured for receiving an electronic message sent by an email sender to an email recipient;
creating a virtual email address for a recipient-identified sender to use to send the electronic message to the email recipient, the virtual email address comprising a sender identification in combination with the recipient's non-encoded email address, wherein the recipient's non-encoded email address is the actual email recipient's email address part of the email used by the email recipient's server to identify the email recipient at the email recipient's server;
enabling the server to identify the email recipient using the recipient's non-encoded email address;
enabling the server to identify the email sender as an authorized email sender when the email sender's identification is in an email to the email recipient;
storing the email sender's identification on the server in an email recipient's account so that it is related to the recipient's non-encoded email address;
using the email recipient's account for storing email comprising the virtual email address;
enabling the email recipient to access the email;
enabling the email recipient to create a virtual email address for assignment to a specific email sender;
receiving the electronic message using the virtual email address;
receiving a second electronic message from a non-user-identified sender at the server, wherein the second electronic message comprises a second virtual email address, the second virtual email address comprising an identification of the non-user-identified sender in combination with the non-encoded recipient's email address, wherein the virtual email address for the non-user-identified is not registered with the recipient's email server;
responding to the non-user-identified sender requesting an answer that only a human could provide;
receiving the answer from the non-user-identified sender and if the answer is correct, then creating an electronic account on the server for the non-user-identified sender and storing the second electronic message in the newly created electronic account;
enabling the server to interpret the virtual email address, the virtual email address comprising a parameter identifying the position of the identification name of the sender and the position of the user's email address within the virtual email address; and
enabling the server to recognize a parameter in the second virtual email address, the parameter comprising an identification of the position of the identification name of the sender and the position of the user's email address within the second virtual email address.

2. The method according to claim 1 further comprising the steps of:
enabling the server to accept an email sent to the user's virtual email address by a non-user-identified and unknown sender if the user's virtual email address comprises a user-identified filter that; and if the identified filter is preset by the email recipient and pre-registered at the recipient's email account before the non-user-identified and unknown sender sends the email; and
redesignating the non-user-identified and unknown sender as a user-identified sender.

3. The method according to claim 1 further comprising the step of:
enabling the server to create the email address configured such that the identification name of the sender and the user's email address in the virtual email address are concatenated without a separating character between them; and
enabling the server to recognize the second electronic message configured such that the identification name of the non-user-identified sender and the user's email address in the second virtual email address are concatenated without a separating character between them.

4. The method according to claim 1 further comprising the step of notifying the non-user-identified sender that an electronic account has been created for the non-user-identified sender on the server.

5. A method of virtual email allowing a non-user-identified sender to send an email to a user at a virtual email address, the method comprising the steps of:
providing an email server, comprising a computer, for receiving an email sent by a non-user-identified sender to a virtual email address for a user, wherein the virtual email address comprises:
an identification of the non-user-identified sender;
a recipient's email address;
wherein the recipient's email address is not encoded;
wherein the recipient's email address is an ID used by the recipient's
email server to identify the recipient in the recipient's email server; and
a user-identified filter that is recognized by the email server to allow email sent to the user by the non-user-identified sender to be received at the email server for the user;
receiving an email at the email server sent to the virtual email address for the user by a sender;
enabling the email server to recognize the user-identified filter when it is part of the non-user-identified virtual email;
enabling the recipient to preset the user-identified filter for virtual email to the recipient;
enabling the email server to interpret the virtual email address, the virtual email address comprising a parameter identifying the position within the virtual email address of the identification name of the non-user-identified sender, the user's email address, and the user-identified filter; and
enabling the server to recognize a parameter in the virtual email address, the parameter comprising an identification of the position within the virtual email address of the identification name of the non-user-identified sender, the user's email address, and the user-identified filter.

6. A computer program product, comprising a non-transitory computer usable memory having a computer readable program code embodied therein, said computer readable program code adapted to be executed on a server causes the server to implement a method for converting an email address to a virtual email address, said method comprising the steps of:

providing a server for creating a sender-specific virtual email address for a user;

accessing an email from an address-book of the two-parts email format wherein the two-parts email format comprises the email-server domain and the email recipient's email address and retrieving an email;

creating said sender-specific virtual email address for a user by combining components comprising the recipient's email address and an identification of the sender from the accessed email, wherein the recipient's email address is not encoded, wherein the recipient's non-encoded email address is the actual email recipient's email address part of the email used by the email recipient's server to identify the email recipient at the email server;

creating a virtual email account on the server designating the sender by the sender-specific virtual email address;

enabling the server to add to the sender-specific virtual email address a parameter, the parameter comprising an identification of the position of the user's email address and an identification of the sender; and enabling the server to recognize a parameter in the sender-specific virtual email address, the parameter comprising an identification of the position of the user's email address and an identification of the sender.

7. The computer program product of claim 6 that causes the server to implement a method, the method further comprising the step of sending an email to the user notifying the user of the sender-specific virtual email address.

8. The computer program product of claim 6 that causes the server to implement a method, the method further comprising the step of enabling the server to assign the same recipient-identified to two or more virtual email senders.

9. The computer program product of claim 6 that causes the server to implement a method, the method further comprising the step of enabling the server to assign two or more recipient-identified filters to the same email recipient.

10. The computer program product of claim 6 that causes the server to implement a method, the method further comprising the step of enabling the server to recognize a single sender's identification from two or more email senders when each email sender has a distinct recipient-identified filter.

11. The computer program product of claim 6 that causes the server to implement a method, the method further comprising the step of enabling the server to assign the same recipient-identified filter to two or more virtual email senders.

12. The computer program product of claim 6 that causes the server to implement a method, the method further comprising the step of enabling the server to recognize two or more recipient-identified filters for an email recipient.

13. The computer program product of claim 6 that causes the server to implement a method, the method further comprising the step of enabling the server to recognize a single sender's identification used by two or more email senders when each email sender has a distinct recipient-identified filter.

\* \* \* \* \*